3,332,938
ALKYLATED LACTAMS AND PROCESS OF PREPARATION

Raymond L. Mayhew, Summit, David Bosniack, Edison, and Frederick Grosser, Midland Park, N.J., assignors to General Aniline & Film Corporation, New York, N.Y., a corporation of Delaware
No Drawing. Filed May 11, 1965, Ser. No. 454,973
14 Claims. (Cl. 260—239.3)

This application is a continuation-in-part of our application Ser. No. 340,799, filed on Jan. 28, 1964, now abandoned.

This invention relates to a new and useful class of alkylated lactams and to the process of preparing the same.

Alkyl-substituted 5-, 6-, and 7-membered lactams containing one or two alkyl groups of from 1 to 4 carbon atoms in the lactam ring are known compounds. Such alkyl-substituted lactams are soluble in water and a certain class of organic polar solvents. The preparation of such alkyl substituted lactams involves an intricate and costly synthesis.

To provide a new class of useful alkylated 5-, 6- and 7-membered lactams and the process of preparing the same by a simple economical and expeditious procedure constitutes the principal object of the present invention.

Other objects and advantages will become apparent from the following description.

The foregoing objects are attained by the addition of an alpha-olefin of at least 2 carbon atoms to a 5-, 6- or 7-membered lactam while employing an organic peroxide as the initiator. The addition (alkylation) is readily accomplished by heating a mixture consisting of from 0.01 to 10 moles of an $\alpha$-olefin of at least 2 carbon atoms and 1 mole of a lactam in the presence of approximately from 0.001 to 1 mole of an organic peroxide per 0.01 to 10 moles of $\alpha$-olefin at a temperature of 120°–160° C. for 6–48 hours. The lactam serves as solvent-diluent for the addition reaction, and if an excess is used it is removed by distillation under reduced pressure ranging from 100 to 1 mm. and the residual product, i.e., the alkylated product, recovered either as a high-boiling liquid or waxy solid.

The only deviation from the foregoing procedure is where low-boiling $\alpha$-olefins of from 2 to 7 carbon atoms are employed. In such case the organic peroxide initiator and the lactam are added into a stainless steel rocker bomb. The low-boiling $\alpha$-olefin is then charged to the bomb and the bomb heated and maintained at the same temperature and period of time as noted above. The pressure developed in the bomb may range from 50 to 600 p.s.i.g. After cooling the contents of the bomb to room temperature, they are discharged into any suitable vacuum distillation equipment to remove the excess lactam and the residual product recovered as a liquid of a boiling point higher than that of the starting lactam.

The 5-, 6- and 7-membered lactams that are alkylated with an alpha-olefin in accordance with the present invention are characterized by the following formula:

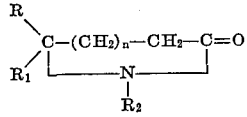

wherein R and $R_1$ represent either hydrogen, methyl or ethyl group, $R_2$ represents either hydrogen, alkyl of from 1 to 18 carbon atoms, amino alkyl of from 1 to 18 carbon atoms, hydroxy alkyl of from 2 to 18 carbon atoms and $n$ represents an integer of from 1 to 3 so as to complete a 5-, 6- or 7-membered heterocyclic ring system.

As examples of such lactams, the following are illustrative:

2-pyrrolidone
5-methyl-2-pyrrolidone
5,5-dimethyl-2-pyrrolidone
5-ethyl-2-pyrrolidone
5-methyl-5-ethyl-2-pyrrolidone
2-piperidone
6-methyl-2-piperidone
6-ethyl-2-piperidone
6,6-diethyl-2-piperidone
caprolactam
7-methyl caprolactam
7-ethyl caprolactam
7,7-diethyl caprolactam The N-substituted lactams, wherein the substituent is characterized by $R_2$ in the foregoing formula, are readily prepared by reacting the corresponding lactones with alkyl primary amines of from 1 to 18 carbon atoms, alkyl diamines of from 2 to 18 carbon atoms and alkanol amines of from 2 to 18 carbon atoms by the well-known and established conventional procedures.

As examples of alkyl primary amines which may be reacted with the corresponding lactones to arrive at an N-alkyl substituent of from 1 to 18 carbon atoms, the following are illustrative:

methyl amine
ethyl amine
n-propyl amine
n-butyl amine
n-hexyl amine
n-octyl amine
decyl amine
lauryl amine
dodecyl amine
hexadecyl amine
octadecyl amine As examples of alkyl diamines which may be reacted with the corresponding lactones to yield amino N-substituted amino alkyl of from 2 to 10 carbon atoms as characterized by $R_2$ in the above formula, the following are illustrative:

ethylene diamine
trimethylene diamine
tetramethylene diamine
hexamethylene diamine
octamethylene diamine
decamethylene diamine
octadecamethylene diamine As examples of alkanol amines which are reacted with the corresponding lactones to yield N-hydroxy alkyls of from 2 to 18 carbon atoms, as characterized by $R_2$ in the foregoing formula, the following are illustrative:

ethanol amine
propanol amine
butanol amine
hexanol amine
octanol amine
decanol amine
dodecanol amine
hexadecanol amine
octadecanol amine Any $\alpha$-olefin having a molecular weight of from about 28 to as high as 1500 may be employed in the alkylation of the foregoing lactams. In other words, the $\alpha$-olefin may contain from 2 to 100 carbon atoms. In the latter category are polybutenes which have molecular weights ranging from 300 to 1500. As illustrative of such α-olefins, the following may be mentioned:

ethene
propene
1-butene
1-pentene
2-ethyl-1-butene
2-methyl-1-pentene
3-ethyl-1-pentene
1-heptene
1-octene
1-nonene
2-ethyl-1-hexene
1-decene
1-dodecene
1-tetradecene
1-hexadecene
1-heptadecene
1-octadecene
1-nonadecene
1-eicosene
1-docosene
1-tetracosene
1-pentacosene
trimerized α-tetradecene
polybutenes, M 300–1500

While linear α-olefins are preferred because of their commercial availability, numerous isomers of α-olefins ranging from 1-pentene to 1-pentacosene as well as polybutenes may also be employed in the alkylation reaction. The only precaution required in such case is that the isomer contain on ethylenic unsaturation in the α-position thereof.

Instead of employing any one of the foregoing individual α-olefins, a mixture of commercially available linear α-olefins produced by cracking petroleum wax or by polymerizing lower olefins may also be used as the alkylating medium. Alpha-olefin mixtures in the carbon range of from $C_6$–$C_7$; $C_7$–$C_9$; $C_9$–$C_{11}$; $C_{11}$–$C_{15}$; and $C_{15}$–$C_{20}$ are commercially available and contain from 81 to 87 weight percent of straight chain α-olefins; from <0.5 to 2 weight percent of straight chain internal olefins; from 13 to 3 weight percent of branched and naphthenic olefins; from 2 to 4 weight percent of paraffins and naphthenes and from 1 to <1 of aromatics, respectively.

As peroxide catalyst (initiator) for the alkylation reaction, any one of the known tertiary-alkyl organic peroxides such as, for example, t-butyl hydro-peroxide, di-t-butyl peroxide, t-butyl perbenzoate, t-butyl peroxide, t-butyl perbenzoate, t-butyl pentamethyl-ethyl peroxide, t-butyl-triphenylmethyl peroxide, di-t-amyl peroxide, bis-(triethylmethyl) peroxide, bis-(triphenylmethyl) peroxide, 2,5-dimethyl-hexyl-2,5-dihydro-peroxide, 2,5-dimethyl-2,5-di(t-butyl peroxy) hexane, 2,5-dimethylhexyl-2,5-di (peroxy benzoate), and the like may be used.

The position at which alkylation occurs in the lactam ring varies, and is partly dependent on the nature of the lactam. In the case of the alkylation of 2-pyrrolidone with octene-1 for instance, the resulting product is primarily a mixture of two isomers, i.e., of about 25–30% of 3-octyl-2-pyrrolidone and about 60–65% of 5-octyl-2-pyrrolidone, if a large excess of 2-pyrrolidone is used in the alkylation reaction. The distribution of these isomers was approximately shown on the basis of nuclear magnetic resonance (NMR) data.

In the case of N-methyl-2-pyrrolidone with octene-1, the isomer distribution by NMR was approximately 0–10% of N-methyl-5-octyl-2-pyrollidone, 40–50% of N-methyl-3-octyl-2-pyrrolidone and 40–50% of N-nonyl-2-pyrrolidone.

Depending on the mole ratio of α-olefin to lactam and on the chain length of the α-olefin employed, more than 1 mole of olefin may react with each mole of lactam. For example, with octene-1, using a 20-molar excess of 2-pyrrolidone, the 1:1 adducts listed above would constitute essentially the entire product. However, if only a 5-molar excess of 2-pyrrolidone were employed, significant amounts of the following 2:1 adducts would be formed:

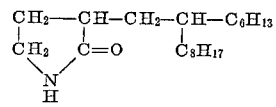

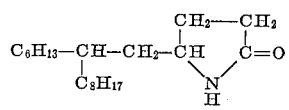

The 1:1 adducts would still predominate. If, instead of octene-1, ethylene is used as the α-olefin, products with molar ratio of 3:1, 4:1, 5:1, 6:1, etc. can be obtained, for example:

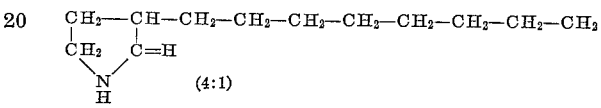

In the alkylation of piperidone and caprolactam using a 20 molar excess of the lactam, the 1:1 adducts would constitute essentially the entire products, i.e., a mixture of two isomers. With piperidone and octene-1, there would be obtained 35–25% of 3-octyl piperidone and 65–75% of 6-octyl piperidone. With caprolactam and octene-1, there would be obtained 35–25% of 3-octyl caprolactam and 65–75% of 7-octyl caprolactam. With a 5 molar excess of piperidone and caprolactam while employing octene-1, significant amounts of 2:1 adducts corresponding to those formed with 2-pyrrolidone would also be obtained. With piperidone the 2:1 adducts would be located on the carbon alpha to the carbonyl and in 6-position. With caprolactam, the same results are obtained as with piperidone with the exception that the 2:1 adduct will be in 7-position instead of the 6-position. If octene-1 is replaced by ethylene, products with molar ratio of 3:1, 4:1, 5:1, 6:1, etc., are also obtained with piperidone and caprolactam. In other words, the propagation of ethylene will take place on the carbon where alkylation occurs.

In the alkylation of pyrrolidone, piperidone and caprolactam containing 1 or 2 methyl or ethyl groups in the 5-, 6- and 7-positions, respectively, alkylation will be predominantly at the 3-position, i.e., on the carbon alpha to the carbonyl. However, when such lower alkyl-substituted lactams are also substituted at the nitrogen atom with an alkyl of from 1 to 18 carbon atoms, aminoalkyl of from 1 to 18 carbon atoms and hydroxy alkyl of from 2 to 18 carbon atoms, alkylation will be predominantly at the 3-position, i.e., on the carbon alpha to the carbonyl, with small amounts at the first carbon, immediately adjacent to the nitrogen atom of the heterocyclic configuration, of the said alkyl, aminoalkyl or hydroxy alkyl. The latter can be best exemplified with an alkylated N-substituted-5-methyl-2-pyrrolidone by the following illustration:

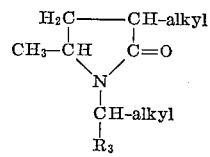

wherein $R_3$ is either hydrogen, alkyl of from 1 to 17 carbon atoms, aminoalkyl of from 1 to 17 carbon atoms or hydroxyalkyl of from 1 to 17 carbon atoms.

In connection with the alkylation of the N-substituted 5-methyl-2-pyrrolidone, it is to be noted that when a 5 molar excess of a lactam containing 1 or 2 methyl or ethyl groups in the 5-, 6- or 7-positions thereof, the 2:1 adducts are formed which will occupy the positions shown by "alkyl" in the foregoing illustration.

From the foregoing, it is apparent that many different alkylated lactams are possible. Under a given set of conditions, the alkylated lactam will consist of two to four isomers. However, for the applications for which these alkylated lactams are intended, such a mixture can be used per se, and in some instances would be preferred over any one of the pure isomers isolated by gas chromatograph separation using a preparation column.

The alkylated lactams prepared in accordance with the present invention in which the 1:1 and 2:1 adducts contain an alkyl of at least 6 carbon atoms are new compounds having new and useful applications as will be pointed out hereinafter. The new compounds are characterized by the following formulae:

(1) 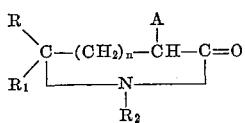

(2) 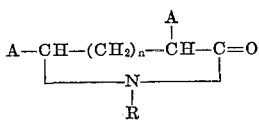

(3) 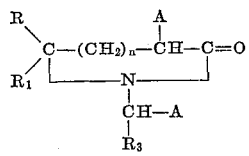

(4) 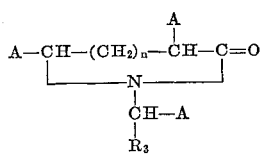

wherein R, $R_1$, $R_2$, $R_3$ and $n$ have the same values as above and the A's are independently selected from the group consisting of hydrogen and radicals of the formula

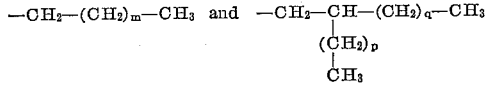

wherein $m$ is an integer of from 4 to 40, $p$ is an integer of from 5 to 41 and $q$ is an integer of from 3 to 39, and wherein at least one of the A's is selected from the said radicals.

The following examples will show how an α-olefin and mixtures of such olefins is employed to alkylate a lactam and the physical characteristics of the resultant alkylated product:

*Example I*

A mixture consisting of 425.5 grams (5.0 moles) of 2-pyrrolidone, 28.1 grams (0.25 mole) of 1-octene and 5.9 grams (0.04 mole) di-t-butyl peroxide was stirred and heated at 120–125° C. for 48 hours. The 2-pyrrolidone was removed under reduced pressure and the product distilled. A yellow liquid, 22.0 grams, B.P. 157–160° C./1 mm., $N_D^{25}$ 1.4713, was obtained which slowly solidified upon standing.

Found: 7.0% N. Calc'd: 7.1% N for $C_8H_{17}$—$C_4H_6NO$.
A dark brown solid residue, 14.7 grams, was retained.
Found: 6.7% N. Calc'd: 7.1% N for $C_8H_{17}$—$C_4H_6NO$.

The lower nitrogen content (6.7%) of the residue indicates that some di-alkylated product is present.

The NMR spectra of the solidified product, as well as a vapor phase chromatograph, indicate it to be a very complex mixture of isomers in which the 3-octyl pyrrolidone comprises about 30%, the 5-octyl pyrrolidone about 60%, and minor amounts of other isomers. The 3- and 5-isomers in the mixture were separated by a gas chromatograph using a preparation column and their structure confirmed by NMR spectra.

High vacuum distillation of the dark brown solid residue yielded a distillate which solidified upon standing. The NMR spectra indicated the product to be a 2:1 adduct in the 3-position of the pyrrolidone ring.

*Example II*

A mixture consisting of 595.7 grams (7.0 moles) 2-pyrrolidine, 137.5 grams (0.7 mole) of a commercially available $C_{12}$–$C_{16}$ α-olefins consisting of 42% of 1-dodecene, 32% of 1-tetradecene and 26% of 1-hexadecene, and 16.1 grams (0.11 mole) of di-t-butyl peroxide was stirred and heated at 135–155° C. for 24 hours. The excess 2-pyrrolidone was removed by distillation at 3 mm. The residue was recovered as a dark brown liquid, $N_D^{25}$ 1.4742, which slowly solidifies to a brown solid. Yield, 178.6 grams (90.7%).

Found: 4.21% N. Calc'd: 4.98% N for $$C_{14}H_{29}\text{—}C_4H_6NO$$

The nitrogen analysis indicates the product to consist of a mixture of about 58% of a mono-alkylated product and about 42% of a di-alkylated product. The distribution of isomers as regards site of alkylation by NMR spectra was found to be similar to that in Example I.

*Example III*

A mixture consisting of 595.7 grams (7.0 moles) 2-pyrrolidone, 253.4 grams (0.7 mole) of a commercially available $C_{20}$+α-olefins, α-olefins consisting of about 77% $C_{20}$–$C_{26}$ and 23% of $C_{28}$–$C_{42}$, and 16.1 grams (0.11 mole) of di-t-butyl peroxide was stirred and heated at 135–155° C. for 24 hours. The excess 2-pyrrolidone was distilled off at 3 mm. The residue was recovered as a dark room liquid which solidified to a tan waxy solid. Yield, 287.7 grams (91.9%).

Found: 1.87% N. Calc'd: 3.12% N for $$C_{26}H_{53}\text{—}C_4H_6NO$$

The nitrogen analysis indicates the product to consist of a mixture of about 11% of a mono-alkylated product and about 89% of a di-alkylated product. The distribution of isomers as regards site of alkylation by NMR spectra was found to be similar to that as in Example I.

*Example IV*

A mixture consisting of 600 grams (6.07 moles) N-methyl-2-pyrrolidone, 137.5 grams (0.7 mole) α-olefin ($C_{12}$–$C_{16}$) and 16.1 grams (0.11 mole) of di-t-butyl peroxide was stirred and heated at 130–150° C. for 24 hours. The excess N-methyl-2-pyrrolidone was removed by distillation at 1–2 mm. The residue was recovered as a light amber liquid, $N_D^{25}$ 1.4795. Yield, 207.8 grams (100%).

Found: 4.98% N. Calc'd: 4.75% N for $$C_{14}H_{29}\text{—}C_5H_8NO$$

The NMR spectra of this product indicated it to be a complex mixture of isomers comprising about 30% of 3-alkyl-N-methyl pyrrolidone, about 40% of 5-alkyl-N-methyl pyrrolidone and about 38% of N-pentadecyl pyrrolidone.

*Example V*

A mixture consisting of 600 grams (6.07 moles) N-methyl-2-pyrrolidone, 137.5 grams (0.7 mole) α-olefin ($C_{20}$–$C_{26}$) and 16.1 grams (0.11 mole) of di-t-butyl peroxide was stirred and heated at 130–150° C. for 24 hours. The excess methylpyrrolidone was removed by distillation at 1–2 mm. The residue was recovered as a light tan, waxy solid. Yield, 297.8 grams (92.3%).

Found: 2.45% N. Calc'd: 3.02% N for $$C_{26}H_{53}\text{—}C_5H_8NO$$

The NMR spectra of this product indicated a distribution of isomers similar to that in Example IV as regards the site of alkylation, but the nitrogen analysis indicated the presence of about 43% of dialkylated product.

*Example VI*

Example I was repeated with the exception that 5 moles of 2-pyrrolidone were repaced by 5 moles of 2-piperidone. The residue was recovered as a dark brown liquid which solidified upon standing.

The product was "distilled" at about 160°–170° C. and 1 mm. pressure of mercury. The distillate consisted of about 65–75% of 6-octyl piperidone and 25–35% of 3-octyl piperidone. The yield of the mixed product was about 45% based on the 1-octene used. The mixture of the 3- and 6-isomers were separated by a gas chromatograph using a preparation column and their structure confirmed by NMR spectra.

*Example VII*

Example I was again repeated with the exception that 5 moles of 2-pyrrolidone were replaced by 5 moles of ε-caprolactam. The residue was recovered as a dark brown liquid which solidified upon standing. The product was "distilled" at 165°–180° C. and 1 mm. pressure of mercury. A yield of 30% of mono-substituted products was obtained based on the 1-octene used. The distillate consisted of 60–75% of 7-octyl caprolactam and about 25–40% of 3-octyl caprolactam. The mixture of the 3- and 7-isomers were separated by a gas chromatograph using a preparation column and their structure confirmed by NMR spectra.

*Example VIII*

Example I was again repeated with the exception that 5 moles of 2-pyrrolidone were replaced by 5 moles of N-octyl-2-pyrrolidone. The residue was recovered as a viscous, yellow liquid which solidified upon standing. The isomer distribution by NMR was approximately 25–35% of 3-octyl-2-pyrrolidone, 40–50% of 5-octyl-N-octyl-2-pyrrolidone, and 25–35% of the octyl substituted product on the α-carbon of the N-octyl chain immediately adjacent to the nitrogen atom of the pyrrolidone ring. The mixture of isomers were separated by a gas chromatograph using a preparation column and their structure confirmed by NMR spectra.

*Example IX*

Example I was again repeated with the exception that 5 moles of 2-pyrrolidone were replaced by 5-moles of N-amino decyl-2-piperidone. The residue was recovered as a very viscous, yellowish brown, liquid which solidified upon standing. The isomer distribution by NMR was approximately 15–25% of 3-substituted product, 35–45% of 6-substituted product and 35–45% of mixed substituted products wherein the hexyl substituents were present on the α-carbon adjacent to the primary amino group and on the α-carbon adjacent to the nitrogen of the piperidone ring of the N-aminodecyl substituent. The mixture of isomers were separated by a gas chromatograph using a preparation column and their structure confirmed by NMR spectra.

*Example X*

Example I was again repeated with the exception that 5 moles of 2-pyrrolidone were replaced by 5 moles of N-hydroxyethyl caprolactam. The residue was recovered as a viscous liquid which solidified upon standing. The isomer distribution by NMR was approximately 25–35% of 3-substituted product, 45–55% of 7-substituted product and 25–35% of the octyl substituted product on the α-carbon of the N-hydroxyethyl chain immediately adjacent to the nitrogen atom of the caprolactam ring. The mixture of isomers were separated by a gas chromatograph using a preparation column and their structure confirmed by NMR spectra.

*Example XI*

Example I was again repeated with the exception that 5 moles of 2-pyrrolidone were replaced by 5 moles of N-ethyl-5-methyl-2-pyrolidone. The residue was recovered as a yellow liquid which solidified upon standing. The isomer distribution by NMR was approximately 55–65% of 3-substituted product and 35–45% of substituted product on the α-carbon of the ethyl side chain immediately adjacent to the nitrogen atom of the pyrrolidone ring. The mixture of isomers were separated by a gas chromatograph using a preparation column and their structure confirmed by NMR spectra.

*Example XII*

A mixture consisting of 1485 grams (15.0 moles) of 5-methyl-2-pyrrolidone, 84.0 grams (1.0 mole) of 1-hexene and 22 grams (0.15 mole) of di-t-butyl peroxide was reacted and heated in a stainless steel bomb at 130–145° C. for 18 hours. The excess 5-methyl-2-pyrrolidone was removed under reduced pressure and the product distilled. A yellow liquid, 110 grams, was obtained which slowly solidified upon standing. The isomer distribution by NMR was found to be predominantly in the 3-position of the pyrrolidone right.

*Example XIII*

Example XII was repeated with the exception that 1-hexene was replaced by an equivalent amount of trimerized α-tetradecene and the product was not distilled. The substituted position by NMR was found to be predominantly in the 3-position of the pyrrolidone ring.

*Example XIV*

Example XII was again repeated with the exception that the 5-methyl-2-pyrrolidone was replaced by an equivalent amount of N-dodecyl-5-methyl-2-pyrrolidone and the product was not distilled. The isomer distribution by NMR was found to be almost equally distributed between the 3-position of the pyrrolidone ring and the α-carbon, immediately adjacent to the nitrogen atom of the pyrrolidone ring, of the dodecyl chain. The mixture of isomers were separated by a gas chromatograph using a preparation column and their structure confirmed by NMR spectra.

The alkylated 2-pyrrolidone, 2-piperidone and ε-caprolactam prepared as above and in which the nitrogen atom is unsubstituted undergo vinylation by first forming the potassium salt by mixing the alkylated compound with about 2% by weight of powdered caustic potash and distilling off water followed by vinylation at about 15 atmospheres of pressure with a mixture of acetylene and nitrogen in the conventional manner. The resulting alkylated N-vinyl lactams polymerize by the conventional solution polymerization to yield homopolymers having solubility in a wide range of polar and non-polar solvents. The solubility can be systematically controlled during the alkylation reaction, both by the type of α-olefin used and the amount thereof, so that after vinylation homopolymers are obtained which are still soluble in polar solvents (alcohols, etc.) as well as all intermediate degrees of solubility between polar and non-polar solvents. Thus, homopolymers with a low degree of alkylation are still soluble in ethanol so that they can be formulated with Freon propellants to yield hair sprays whose sensitivity to moisture is considerably reduced. Homopolymers with a high degree of alkylation are soluble in aliphatic hydrocarbons, mineral and lube oils. In the latter case, they are useful as sludge dispersants and viscosity index improvers for lubricating oils. This is in sharp contrast to homopolymers prepared from non-alkylated N-vinyl lactams which are insoluble in aliphatic hydrocarbons, mineral oils and lube oils.

The alkylated pyrrolidones, piperidones and ε-caprolactams prepared as above are useful intermediates for the preparation of a variety of chemical products. For example, the lactone ring of each of these intermediates opens during acid or alkali hydrolysis to yield alkylated-aminobutyric, amino-valeric and aminocaproic acids, respectively, which are capable of further reaction through either the amino or carboxy group. The esters of these acids have utility as plasticizers for polyvinyl chloride and other polymers and copolymers. They fuse at about 180° C. with sodium or potassium cyanide to yield the alkali salts of cyano acids.

The alkylated products derived from the N-alkyl-2-pyrrolidones are especially useful for incorporation into polyalkylene plastics such as polyethylene, polypropylene and polybutene to improve the dye receptivity thereof either in sheet form, fiber or fabric.

While the present invention has been described with regard to the addition of α-olefins to the various lactams, we have during the experimentation therewith discovered that we can readily replace the α-olefins by polyhaloethylenes such as, for example, dichlorovinylidine fluoride ($CCl_2=CF_2$), chlorovinylidene fluoride ($CHCl=CF_2$), chlorotrifluoroethylene ($CClF=CF_2$), tetrafluoroethylene ($CF_2=CF_2$), tetrachloroethylene ($CCl_2=CCl_2$), vinylidene fluoride ($CH_2=CF_2$), vinylidene bromide $$(CH_2=CBr_2)$$

vinylidene chloride ($CH_2=CCl_2$), vinylidene bromochloride, i.e., 1-bromo-1-chloroethylene ($CH_2=CBrCl$), vinylidene bromofluoride ($CH_2=CBrF$), vinylidene chlorofluoride ($CH_2=CClF$), 1,2-dichloro-1,2-difluoroethylene ($CClF=CClF$), 1,2-difluoroethylene ($CHF=CHF$), 1-chloro-2-fluoroethylene ($CHF=CHCl$), 1-bromo-2-fluoroethylene ($CHF=CHBr$), 1-dichloro-2-fluoroethylene ($CHF=CCl_2$), 1-bromo-1,2-difluoroethylene $$(CHF=CBrF)$$

1-dibromo-2-fluoroethylene ($CHF=CBr_2$), trichloroethylene ($CHCl=CCl_2$), 1-chloro-1,2-dibromoethylene ($CHBr=CBrCl$), trifluoroethylene ($CF_2=CHF$), tribromoethylene ($CHBr=CBr_2$), 1-bromo-2-difluoroethylene ($CF_2=CHBr$), 1-chloro-1-bromo-2-difluoroethylene ($CF_2=CBrCl$), 1-dibromo-2-difluoroethylene ($CF_2=CBr_2$), 1-dichloro-2-difluoroethylene $$(CF_2=CCl_2)$$

chlorotrifluoroethylene ($CF_2=CClF$), 1-bromo-2-fluoroethylene ($CHF=CHBr$), 1-chloro-2-difluoroethylene ($CF_2=CHCl$), 1-dichloro-2-difluoroethylene $$(CF_2=CCl_2)$$

chlorotrifluoroethylene ($CF_2=CClF$), bromotrifluoroethylene ($CF_2=CBrF$), fluorotrichloroethylene $$(CCl_2=CClF)$$

trichloroiodoethylene ($CCl_2=CClI$), chlorodiiodoethylene ($CHCl=CI_2$), 1,2-dichloro-1,2-diiodoethylene ($CClI=CClI$), 1-bromo-2-iodoethylene ($CHI=CHBr$), 1-iodo-2-chloroethylene ($CHCl=CHI$), etc., to yield a series of new polyhaloethyl lactams useful as intermediates of agricultural pesticides, dyes and fire-retardant compositions. The conditions for the polyhaloethylation reaction with such polyhaloethylenes is precisely the same as that outlined above for low boiling α-olefins of from 2 to 7 carbon atoms.

In lieu of polyhaloethylenes, allyl alcohol or allyl cyanide may be used. With the former, the hydroxy function is introduced making possible further reactions to many useful derivatives. With the latter, the nitrile group can be converted to amide or carboxyl, making possible many other useful derivatives.

While the present invention has been described with respect to the alkylation of a preferred class of 5-, 6- and 7-membered lactams, the alkylation procedure with α-olefins and polyhaloethylenes may also be carried out with lactams containing lower alkyl substituents in various positions of the lactam ring provided that at least one of the positions α- to the carbonyl or on the —$CH_2$— bridge α- to the imino group is free from such substituents. Lactams of this type include 3-methyl pyrrolidone, 3-ethyl pyrrolidone, 4-methyl pyrrolidone, 4-ethyl pyrrolidone, 4,4-dimethyl pyrrolidone, 4,5-dimethyl pyrrolidone, 4,5,5-trimethyl pyrrolidone, 3-methyl piperidone, 4-methyl piperidone, 4-ethyl piperidone, 4,4-dimethyl piperidone, 5-methyl piperidone, 5,5-dimethyl piperidone, 5,5-diethyl piperidone, 5,6-dimethyl piperidone, 5-ethyl-6-methyl piperidone, 3-methyl caprolactam, 3,5-dimethyl caprolactam, 3,6-dimethyl caprolactam, 4-methyl caprolactam, 4,6-dimethyl caprolactam, 4-ethyl-6-methyl caprolactam, 5-methyl caprolactam, 5-ethyl caprolactam, 6-methyl caprolactam, 6-ethyl caprolactam, 4-methyl-6-ethyl caprolactam, etc., to yield a new class of useful products.

It is to be understood that the lower alkyl substituted lactams of the foregoing type may also bear an N-substituted group defined by $R_2$. Such N-substituted lactams are readily prepared by reacting the corresponding lower alkyl substituted lactones of this type with alkyl primary amines, alkyl diamines and alkanol amines of the class heretofore illustrated.

We claim:

1. Alkylated lactams selected from the group consisting of those having the following formulae:

(1) 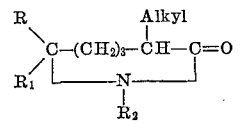

(2) 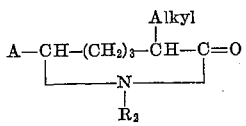

(3) 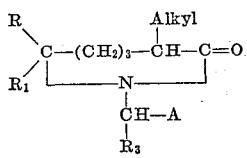

(4) 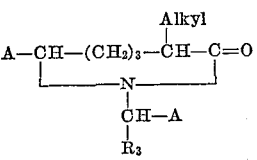

wherein R and $R_1$ are selected from the group consisting of hydrogen, methyl and ethyl, $R_2$ is selected from the group consisting of hydrogen, alkyl of from 1 to 18 carbon atoms, aminoalkyl of from 1 to 18 carbon atoms and hydroxyalkyl of from 2 to 18 carbon atoms, $R_3$ is selected from the group consisting of hydrogen, alkyl of from 1 to 17 carbon atoms, aminoalkyl of from 1 to 17 carbon atoms and hydroxyalkyl of from 1 to 17 carbon atoms, the A's are independently selected from the group consisting of hydrogen and alkyl radicals, wherein said alkyl radicals and the symbol Alkyl in Formulas 1 to 4 inclusive are alkyl radicals of the formulae:

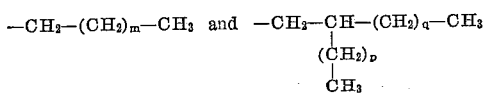

wherein $m$ is an integer of from 4 to 40, $p$ is an integer of from 5 to 41 and $q$ is an integer of from 3 to 39, and wherein at least one of the A's in Formula 4 is selected from the said alkyl radicals.

2. Alkylated lactam having the following formula:

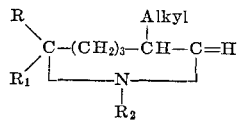

wherein R and R₁ are selected from the group consisting of hydrogen, methyl and ethyl, $R_2$ is selected from the group consisting of hydrogen, alkyl of from 1 to 18 carbon atoms, aminoalkyl of from 1 to 18 carbon atoms and hydroxyalkyl of from 2 to 18 carbon atoms, and alkyl is selected from the group consisting of radicals of the formulae:

$$-CH_2-(CH_2)_m-CH_3$$

and $$-CH_2-CH-(CH_2)_q-CH_3$$
$$\quad\quad |$$
$$\quad (CH_2)_p$$
$$\quad\quad |$$
$$\quad\quad CH_3$$

wherein $m$ is an integer of from 4 to 40, $p$ is an integer of from 5 to 41 and $q$ is an integer of from 3 to 39.

3. Alkylated lactam having the following formula:

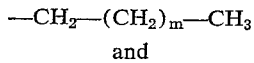

wherein $R_2$ is selected from the group consisting of hydrogen, alkyl of from 1 to 18 carbon atoms, aminoalkyl of from 1 to 18 carbon atoms and hydroxyalkyl of from 2 to 18 carbon atoms, the A is independently selected from the group consisting of hydrogen and alkyl radicals, wherein said alkyl radicals and the symbol Alkyl in the formula are alkyl radicals of the formulae:

$$-CH_2-(CH_2)_m-CH_3 \text{ and } -CH_2-CH-(CH_2)_q-CH_3$$
$$\quad\quad\quad\quad\quad\quad\quad\quad\quad\quad\quad\quad\quad\quad |$$
$$\quad\quad\quad\quad\quad\quad\quad\quad\quad\quad\quad\quad\quad (CH_2)_p$$
$$\quad\quad\quad\quad\quad\quad\quad\quad\quad\quad\quad\quad\quad\quad |$$
$$\quad\quad\quad\quad\quad\quad\quad\quad\quad\quad\quad\quad\quad\quad CH_3$$

wherein $m$ is an integer of from 4 to 40, $p$ is an integer of from 5 to 41 and $q$ is an integer of from 3 to 39.

4. Alkylated lactam having the following formula:

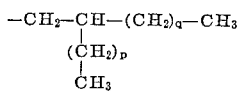

wherein R and R₁ are selected from the group consisting of hydrogen, methyl and ethyl, $R_3$ is selected from the group consisting of hydrogen, alkyl of from 1 to 17 carbon atoms, aminoalkyl of from 1 to 17 carbon atoms and hydroxyalkyl of from 1 to 17 carbon atoms, the A is independently selected from the group consisting of hydrogen and alkyl radicals, wherein said alkyl radicals and the symbol Alkyl in the formula are alkyl radicals of the formulae:

$$-CH_2-(CH_2)_m-CH_3 \text{ and } -CH_2-CH-(CH_2)_q-CH_3$$
$$\quad\quad\quad\quad\quad\quad\quad\quad\quad\quad\quad\quad\quad\quad |$$
$$\quad\quad\quad\quad\quad\quad\quad\quad\quad\quad\quad\quad\quad (CH_2)_p$$
$$\quad\quad\quad\quad\quad\quad\quad\quad\quad\quad\quad\quad\quad\quad |$$
$$\quad\quad\quad\quad\quad\quad\quad\quad\quad\quad\quad\quad\quad\quad CH_3$$

wherein $m$ is an integer of from 4 to 40, $p$ is an integer of from 5 to 41 and $q$ is an integer of from 3 to 39.

5. Alkylated lactam having the following formula:

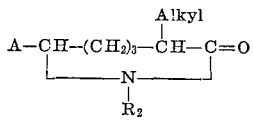

wherein $R_3$ is selected from the group consisting of hydrogen, alkyl of from 1 to 17 carbon atoms, aminoalkyl of from 1 to 17 carbon atoms and hydroxyalkyl of from 1 to 17 carbon atoms, the A's are independently selected from the group consisting of hydrogen and alkyl radicals, wherein said alkyl radicals and the symbol Alkyl in the formula are alkyl radicals of the formulae:

$$-CH_2-(CH_2)_m-CH_3 \text{ and } -CH_2-CH-(CH_2)_q-CH_3$$
$$\quad\quad\quad\quad\quad\quad\quad\quad\quad\quad\quad\quad\quad\quad |$$
$$\quad\quad\quad\quad\quad\quad\quad\quad\quad\quad\quad\quad\quad (CH_2)_p$$
$$\quad\quad\quad\quad\quad\quad\quad\quad\quad\quad\quad\quad\quad\quad |$$
$$\quad\quad\quad\quad\quad\quad\quad\quad\quad\quad\quad\quad\quad\quad CH_3$$

wherein $m$ is an integer of from 4 to 40, $p$ is an integer of from 5 to 41 and $q$ is an integer of from 3 to 39, and wherein at least one of the A's is selected from the said radicals.

6. The process of preparing alkylated lactams which comprises heating from 0.01 to 10 moles of an α-olefin of from 2 to 100 carbon atoms with 1 mole of a lactam having the following formula:

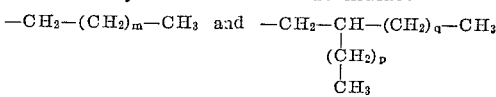

wherein R and R₁ are selected from the group consisting of hydrogen, methyl and ethyl, $R_2$ is selected from the group consisting of hydrogen, alkyl of from 1 to 18 carbon atoms, aminoalkyl of from 1 to 18 carbon atoms and hydroxyalkyl of from 1 to 17 carbon atoms, and $n$ is an integer of from 1 to 3, at a temperature of from 120° to 160° C. in the presence of from 0.001 to 1 mole of an organic peroxide selected from the group consisting of tertiary alkyl peroxide and hydroperoxide per 0.01 to 10 moles of said α-olefin, the prepared alkylated lactam containing an alkyl radical of from 6 to 100 carbon atoms on the carbon atom alpha to the carbonyl, and on at least one of the carbon atoms omega to the carbonyl when R and R₁ are hydrogen, and on the alpha carbon atom adjacent to the nitrogen moiety of said lactam when $R_2$ is any member selected from said group other than hydrogen.

7. The process of preparing alkylated 2-pyrrolidone which comprises heating from 0.01 to 10 moles of an α-olefin of from 2 to 100 carbon atoms with 1 mole of 2-pyrrolidone at a temperature of from 120° to 160° C. in the presence of from 0.001 to 1 mole of an organic peroxide selected from the group consisting of tertiary alkyl peroxide and hydroperoxide per 0.01 to 10 moles of said olefin, the prepared alkylated 2-pyrrolidone containing an alkyl radical of from 6 to 100 carbon atoms on at least one of the carbon atoms alpha and omega to the carbonyl moiety of said pyrrolidone.

8. The process of preparing alkylated N-alkyl-2-pyrrolidone which comprises heating from 0.01 to 10 moles of an α-olefin of from 2 to 100 carbon atoms with 1 mole of N-methyl-2-pyrrolidone at a temperature of from 120° to 160° C. in the presence of from 0.001 to 1 mole of an organic peroxide selected from the group consisting of tertiary alkyl peroxide and hydroperoxide per 0.01 to 10 moles of said olefin, the prepared alkylated N-alkyl-2-pyrrolidone containing an alkyl radical of from 6 to 100 carbon atoms on the carbon atom alpha to the carbonyl and on at least one of the carbon atoms omega to the carbonyl and on the carbon atom of the N-methylene moiety of said pyrrolidone.

9. The process of preparing alkylated 2-piperidone which comprises heating from 0.01 to 10 moles of an α-olefin of from 2 to 100 carbon atoms with 1 mole of 2-piperidone at a temperature of from 120° to 160° C. in the presence of from 0.001 to 1 mole of an organic peroxide selected from the group consisting of tertiary alkyl peroxide and hydroperoxide per 0.01 to 10 moles of said olefin, the prepared alkylated 2-piperidone containing an alkyl radical of from 6 to 100 carbon atoms on at least one of the carbon atoms alpha and omega to the carbonyl moiety of said piperidone.

10. The process of preparing alkylated ε-caprolactam which comprises heating from 0.01 to 10 moles of an α-olefin of from 2 to 100 carbon atoms with 1 mole of ε-caprolactam at a temperature of from 120° to 160° C. in the presence of from 0.001 to 1 mole of an organic peroxide selected from the group consisting of tertiary alkyl peroxide and hydroperoxide per 0.01 to 10 moles of said olefin, the prepared alkylated ε-caprolactam containing an alkyl radical of from 6 to 100 carbon atoms on at least one of the carbon atoms alpha and omega to the carbonyl moiety of said caprolactam.

11. The process of preparing alkylated 2-pyrrolidone which comprises heating 0.05 moles of 1-octene with 1 mole of 2-pyrrolidone at a temperature of from 120° to 125° C. in the presence of 0.008 mole of di-t-butyl peroxide, the prepared alkylated 2-pyrrolidone containing an octyl radical on the carbon atom alpha to the carbonyl and on the carbon atom omega to the carbonyl moiety of said pyrrolidone.

12. The process of preparing alkylated 2-pyrrolidone which comprises heating 0.11 moles of a mixture of α-olefins consisting of 42% of 1-dodecene, 32% of 1-tetradecene and 26% of 1-heptadecene with 1 mole of 2-pyrrolidone at a temperature of from 135° to 155° C. in the presence of 0.015 mole of di-t-butyl peroxide, the prepared alkylated 2-pyrrolidone containing an alkyl radical of about 14 carbon atoms on the carbon atom alpha to the carbonyl and on the carbon atom omega to the carbonyl moiety of said pyrrolidone.

13. The process of preparing alkylated 2-piperidone which comprises heating 0.05 moles of 1-octene with 1 mole of 2-piperidone at a temperature of from 120° to 125° C. in the presence of 0.0008 mole of di-t-butyl peroxide, the prepared alkylated 2-piperidone containing an octyl radical on the carbon atom alpha to the carbonyl and on the carbon atom omega to the carbonyl moiety of said piperidone.

14. The process of preparing alkylated ε-caprolactam which comprises heating 0.008 moles of 1-octene with 1 mole of ε-caprolactam at a temperature of from 120° to 125° C. in the presence of 0.008 mole of di-t-butyl peroxide, the prepared alkylated ε-caprolactam containing an octyl radical on the carbon atom alpha to the carbonyl and on the carbon atom omega to the carbonyl moiety of said caprolactam.

References Cited

UNITED STATES PATENTS

| | | | |
|---|---|---|---|
| 3,000,878 | 6/1961 | Phillips et al. | 260—239.3 |
| 3,065,237 | 11/1962 | Bortnick et al. | 260—294.7 |

WALTER A. MODANCE, *Primary Examiner.*

A. D. SPEVACK, *Assistant Examiner.*